US012729015B1

(12) United States Patent
Pieszala et al.

(10) Patent No.: US 12,729,015 B1
(45) Date of Patent: Sep. 8, 2026

(54) GAS TURBINE ENGINE CONDITION MONITORING AND MANAGEMENT

(71) Applicant: RTX CORPORATION, Farmington, CT (US)

(72) Inventors: Heather Pieszala, Glastonbury, CT (US); Keith J. Kucinskas, West Hartford, CT (US); Alvin Poh, Singapore (SG); Michael J. Denton, Honolulu, HI (US); Aaron C. Bergeron, Hartford, CT (US); Ernesto J. Rodriguez, Saint Augustine, FL (US)

(73) Assignee: RTX CORPORATION, Farmington, CT (US)

( * ) Notice: Subject to any disclaimer, the term of this patent is extended or adjusted under 35 U.S.C. 154(b) by 258 days.

(21) Appl. No.: 17/581,271

(22) Filed: Jan. 21, 2022

(51) Int. Cl.
*B64F 5/60* (2017.01)
*G07C 5/00* (2006.01)
*G07C 5/08* (2006.01)

(52) U.S. Cl.
CPC ................ *B64F 5/60* (2017.01); *G07C 5/006* (2013.01); *G07C 5/0808* (2013.01)

(58) Field of Classification Search
CPC .......... B64F 5/60; G07C 5/006; G07C 5/0808
See application file for complete search history.

(56) References Cited

U.S. PATENT DOCUMENTS 7,979,192 B2 7/2011 Morrison et al.
9,558,450 B2 1/2017 Kamenka et al.
10,417,614 B2 9/2019 Johnson et al.
11,138,816 B1* 10/2021 Bechhoefer ............ G07C 5/085
2017/0286572 A1 10/2017 Hershey et al.
2017/0323274 A1* 11/2017 Johnson ............... G05B 13/041
2019/0146436 A1* 5/2019 Perez Zarate .......... G16H 40/67 700/287
2019/0330998 A1* 10/2019 Griffiths ................ F01D 21/003

FOREIGN PATENT DOCUMENTS

EP 3493128 A1 6/2019

OTHER PUBLICATIONS

Search Report Issued Jun. 1, 2023.

* cited by examiner

*Primary Examiner* — Scott A Browne
*Assistant Examiner* — Rami Nabih Bedewi
(74) *Attorney, Agent, or Firm* — CANTOR COLBURN LLP

(57) ABSTRACT

According to an embodiment, a method includes receiving engine data associated with an engine. The method further includes analyzing the engine data to determine a number of engine on-wing performance analyses to perform and a number of engine shop visit performance analyses to perform. The method further includes performing an engine on-wing performance analysis. The method further includes performing an engine shop visit performance analysis. The method further includes performing a workscope analysis to generate a recommendation. The method further includes causing the recommendation to be implemented to service the engine.

20 Claims, 10 Drawing Sheets

A
20
46
28
38
54
26
56
50
32
36
24
30
52
40
44
38
B
48
22
C
42
38

800
702
Performance data
704
Optimization solver (deterioration and recovery analyzer)
706
Automated evaluation of results through criteria
708
Are results acceptable?
Y
N
810
End of Analysis for installation
726
Boundaries set
712
Decision tree rules employed
814
816
Part level information
818
workscope levels

GAS TURBINE ENGINE CONDITION MONITORING AND MANAGEMENT

BACKGROUND

The subject matter disclosed herein generally relates to gas turbine engine communication systems and, more particularly, to gas turbine engine condition monitoring and management.

Gas turbine engines require maintenance at various points throughout its useful life. In some cases, maintenance can be performed at predefined intervals depending on engine parameters, estimated lifetime of components, and the like. In other cases, maintenance is performed upon the occurrence of an event, such as a failure of a component.

BRIEF DESCRIPTION

According to an embodiment, a method is provided. The method includes receiving engine data associated with an engine. The method further includes analyzing the engine data to determine a number of engine on-wing performance analyses to perform and a number of engine shop visit performance analyses to perform. The method further includes performing an engine on-wing performance analysis. The method further includes performing an engine shop visit performance analysis. The method further includes performing a workscope analysis to generate a recommendation. The method further includes causing the recommendation to be implemented to service the engine.

In addition to one or more of the features described above or below, or as an alternative, further embodiments may include that the engine data includes at least one of a thrust rating history, shop visit information, vibration information, performance parameters, known issues, engine installation history, life limited part information, event information, and watch items.

In addition to one or more of the features described above or below, or as an alternative, further embodiments may include that the engine on-wing performance analysis is performed for a cruise phase or takeoff phase of flight.

In addition to one or more of the features described above or below, or as an alternative, further embodiments may include the engine shop visit performance analysis is performed for a cruise phase of flight and a takeoff phase of flight.

In addition to one or more of the features described above or below, or as an alternative, further embodiments may include cleaning the engine data subsequent to analyzing the engine data.

In addition to one or more of the features described above or below, or as an alternative, further embodiments may include performing post processing on the engine data subsequent to analyzing the engine data.

In addition to one or more of the features described above or below, or as an alternative, further embodiments may include that performing the post processing comprises determining a plurality of delta values, wherein the plurality of delta values represent differences in the engine data from a first time to a second time.

In addition to one or more of the features described above or below, or as an alternative, further embodiments may include calculating a potential recovery.

In addition to one or more of the features described above or below, or as an alternative, further embodiments may include performing a time on-wing projection analysis.

According to an embodiment, system is provided. The system includes a memory comprising computer readable instructions a processing device for executing the computer readable instructions. The computer readable instructions control the processing device to perform operations. The operations include receiving engine data associated with an engine. The operations further include analyzing the engine data to determine a number of engine on-wing performance analyses to perform and a number of engine shop visit performance analyses to perform. The operations further include performing an engine on-wing performance analysis. The operations further include performing an engine shop visit performance analysis. The operations further include performing a workscope analysis to generate a recommendation. The operations further include causing the recommendation to be implemented to service the engine.

In addition to one or more of the features described above or below, or as an alternative, further embodiments may include that the engine data comprises at least one of a thrust rating history, shop visit information, vibration information, performance parameters, known issues, engine installation history, life limited part information, event information, and a watch item.

In addition to one or more of the features described above or below, or as an alternative, further embodiments may include that the engine on-wing performance analysis is performed for a cruise phase or takeoff phase of flight.

In addition to one or more of the features described above or below, or as an alternative, further embodiments may include that the engine shop visit performance analysis is performed for a cruise phase of flight and a takeoff phase of flight.

In addition to one or more of the features described above or below, or as an alternative, further embodiments may include that the operations further include cleaning the engine data subsequent to analyzing the engine data.

In addition to one or more of the features described above or below, or as an alternative, further embodiments may include that the operations further include performing post processing on the engine data subsequent to analyzing the engine data.

In addition to one or more of the features described above or below, or as an alternative, further embodiments may include that performing the post processing comprises determining a plurality of delta values, wherein the plurality of delta values represent differences in the engine data from a first time to a second time.

In addition to one or more of the features described above or below, or as an alternative, further embodiments may include that the operations further include calculating a potential recovery.

In addition to one or more of the features described above or below, or as an alternative, further embodiments may include that the operations further include performing a time on-wing projection analysis.

According to an embodiment, a computer program product is included. The computer program product includes a computer readable storage medium having program instructions embodied therewith, the program instructions executable by a processor to cause the processor to perform operations. The operations include receiving engine data associated with an engine. The operations further include analyzing the engine data to determine a number of engine on-wing performance analyses to perform and a number of engine shop visit performance analyses to perform. The operations further include performing an engine on-wing performance analysis. The operations further include performing an engine shop visit performance analysis. The operations further include performing a workscope analysis to generate a recommendation. The operations further include causing the recommendation to be implemented to service the engine.

In addition to one or more of the features described above or below, or as an alternative, further embodiments may include that the operations further include cleaning the engine data subsequent to analyzing the engine data. The operations can further include performing post processing on the engine data subsequent to analyzing the engine data, wherein performing the post processing comprises determining a plurality of delta values, wherein the plurality of delta values represent differences in the engine data from a first time to a second time. The operations can further include calculating a potential recovery. The operations can further include performing a time on-wing projection analysis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus, system, and method are presented herein by way of exemplification and not limitation with reference to the Figures.

Figure 1:
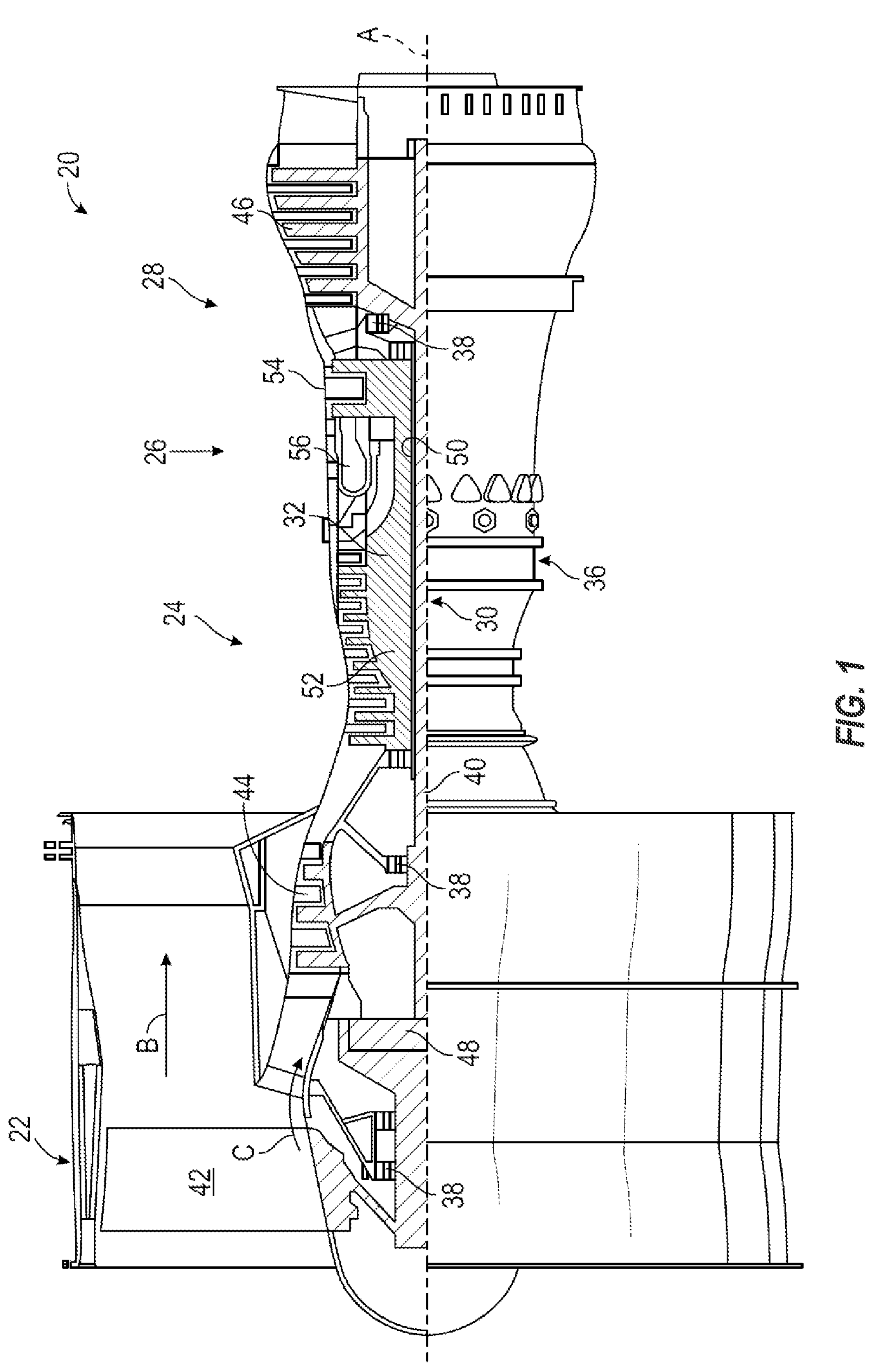
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
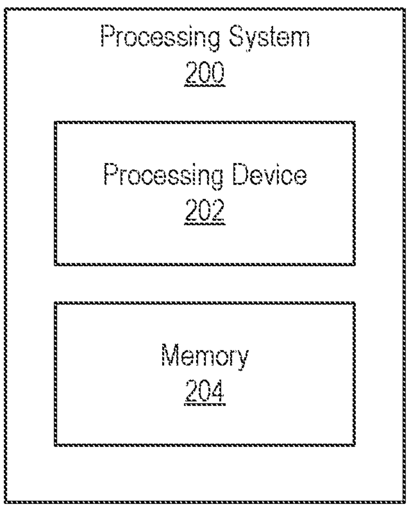
FIG. 2 is a block diagram of a system for gas turbine engine condition monitoring and management according to one or more embodiments described herein.

Referring now to FIG. 2, a system 200 for gas turbine engine condition monitoring and management is provided according to one or more embodiments described herein. The system 200, which can be referred to as a processing system, includes a processing device 202 (e.g., a processor, multiple processors, etc.), a memory 204 (e.g., a random access memory (RAM), a read-only memory (ROM), etc., including combinations thereof). The system 200 can be any suitable type of processing system, such as a server, laptop, tablet computer, smart phone, cloud node of a cloud computing environment, and the like without limitation.

The features and functionality described herein regarding the methods of FIGS. 3-10 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the features and functionality described herein can be a combination of hardware and programming. The programming can be processor executable instructions stored on a tangible memory, and the hardware can include the processing device 202 for executing those instructions. Thus a system memory (e.g., memory 204) can store program instructions that when executed by the processing device 202 implement the engines described herein. Other engines can also be utilized to include other features and functionality described in other examples herein.

The processing system 200 can be used to provide gas turbine engine condition monitoring and management. Historically, engine maintenance planning workscopes were generated mostly based on service bulletins, life limited parts, boroscope inspections, and on-wing findings. Engineering induction performance analysis were also requested in a pull process on an ad hoc need basis where a review was performed leveraging the on-wing data. Hence, not all engines had a workscope that was fully optimized. Additionally, these analyses require large amounts of data and tools from multiple scattered sources, which led to reliability issues, and such analysis required significant manual effort to perform.

In an effort to cure these deficiencies of the prior art, one or more embodiments described herein provide a push process that provides for generating new digital automated tools to mature as quickly as possible. Accordingly, barriers such as decentralized data sources and performance validity discrepancies are overcome. One or more embodiments provide for establishing a push enabled digital thread and twin process, which provides repeatable automated analytics to optimize workscope and engine health forecasting.

One or more embodiments described herein provide tools and procedures for optimal and efficient engine maintenance, repair, and overhaul. A digital thread ties together the history from different engines and provides recommendations and predictions informed by live, on-wing engine operating conditions. One or more embodiments can determine optimal time(s) to remove an engine, what maintenance should be performed, etc. while minimizing costs and decreasing down time. The determination can be based on data from multiple sources within the engine and/or external to the engine. The data can be analyzed on a per-engine basis, for example, using the serial number of the engine as an identifier. Examples of analytics can include determining an expected hot section interval, determining a vibration response (test cell pass-off), identifying life limited parts, determining exhaust gas temperature (EGT) time on-wing, determining ability to pass-off test with minimal workscope, determining other test cell parameters such as N1 margin, determining recoverable performance by module given a workscope/part refurbishment, determining a projected operability margin for work performed throughout an upcoming interval, determining inspections for oil hiding issues utilizing on-wing risk ranking, and determining various other engineering on-watch issues and customer specific contract requirements/terms.

Figure 3:
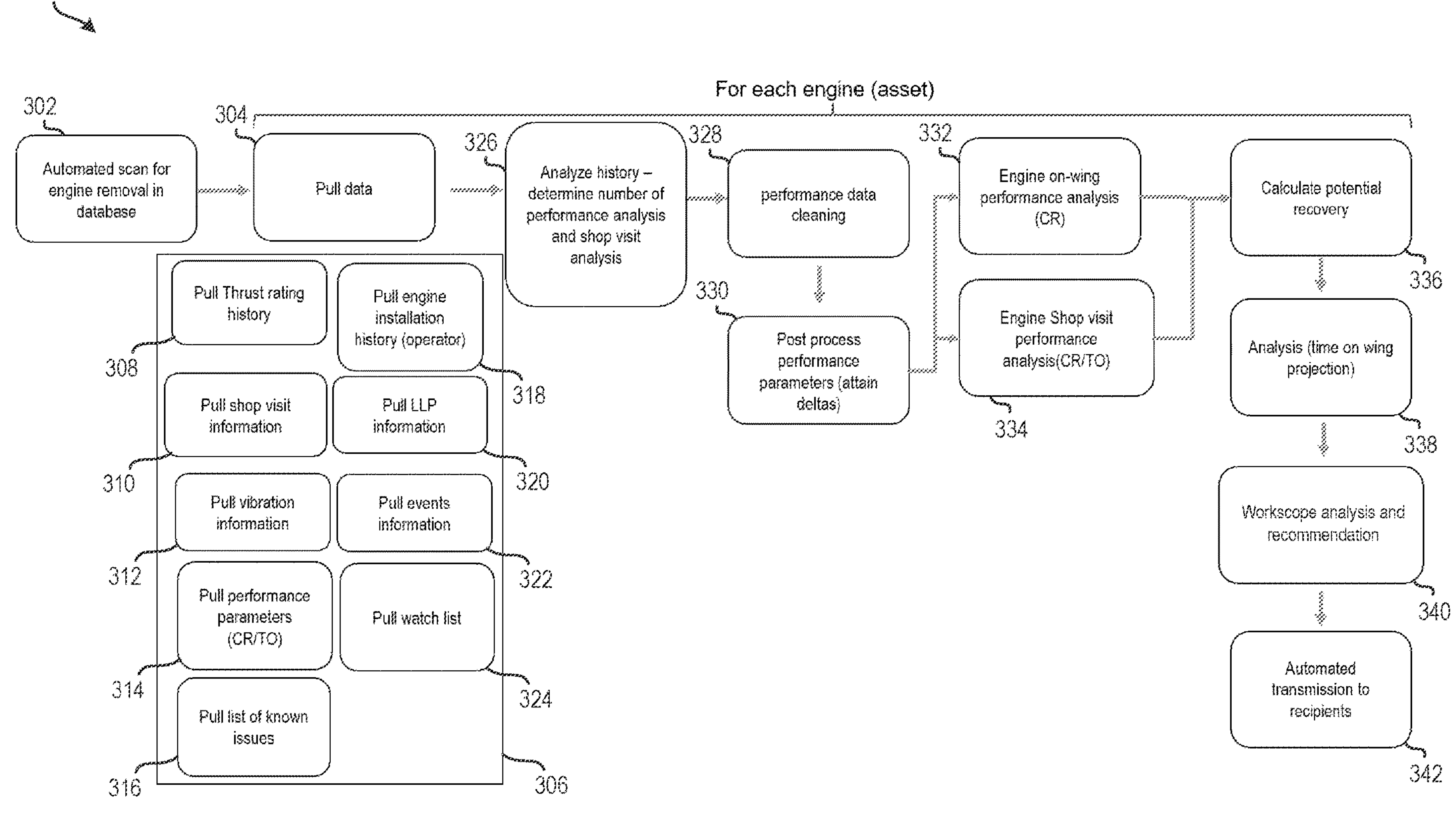
FIG. 3 is a flow chart illustrating a method according to one or more embodiments described herein.

Referring now to FIG. 3 with continued reference to FIGS. 1 and 2, FIG. 3 is a flow chart illustrating a method 300. In particular, FIG. 3 depicts a method 300 for rule-based modular performance workscoping according to one or more embodiments described herein. The method 300 may be performed, for example, by the processing system 200 of FIG. 2 individually and/or in conjunction with an engine controller (not shown) associated with the gas turbine engine 20.

At block 302, an automated scan is performed for engine removal in a database or other suitable data store. According to one or more embodiments described herein, blocks 304-342 are performed on a per-engine basis (e.g., for each engine). In some examples, the automated scan expands deterioration and recovery analysis to a real-time (or near-real-time) calculation for each engine regardless of removal status. See the description of FIG. 4 for additional details.

At block 304, data is pulled from the gas turbine engine 20 (e.g., via an engine controller associated with the gas turbine engine 20). As shown in block 306, pulling the data at block 304 can include one or more of: pulling thrust rating history (block 308), pulling shop visit information (block 310), pulling vibration information (block 312), pulling performance parameters (block 314) such as for cruise and/or takeoff (although this is not limiting, and the methodology described herein can be applied to any flight phase(s)), pull a list of known issues (block 316), pulling engine installation history (block 318), pulling life limited part (LLP) information (block 320), pulling events information (block 322), and/or pulling a watch item(s) (block 324). Watch items include other aspects that may be on watch such as if the engine has a part that was in a specific part batch with a flaw. For example, watch items can range from documented shifts in the gas path, to a fault that keeps occurring that would drive maintenance, to a part on the engine being in a suspect population that needs to be replaced, etc.

At block 326, the historical information from the data pulled at block 304 is analyzed. This can include determining a number of performance analysis and shop visit analysis to perform. See the description of FIG. 5 for additional details.

At block 328, the data are cleaned by performing data cleaning. This can include removing outliers, noise, etc. from the data. See the description of FIG. 6 for additional details.

At block 330, post process performance parameters are obtained using the clean data from block 328. According to one or more embodiments described herein, post process parameters can include "deltas" (or "delta values") which are differences in the data (e.g., from block 304) across periods of time (e.g., on wing, in shop, etc.). See the description of FIG. 6 for additional details.

At block 332, an engine on-wing performance analysis is performed for take-off periods (e.g., using deltas during take-off periods) and cruise periods (e.g., using deltas during cruise periods). It should be appreciated that the analysis at block 332 can be performed for any relevant phase of flight. See the description of FIG. 7 for additional details. More particularly, the deltas during cruise are input into a solver with influence coefficients, constraints, bounds, coupling factors, and limits and translated into resulting deterioration per module. For example, the margin delta can be a takeoff realistic worst case margin delta, from each of the deterioration periods of interest, which can be used to convert the gas path deterioration seen across the deterioration period of interest into the exhaust gas temperature deterioration per engine module. The realistic worst case is a margin in a specified ambient condition. However, other conditions can also be utilized other than the realistic worst case and thus is provided for example purposes as is not intended to be limiting. While this example is described with respect to exhaust gas temperature deterioration, the analyses described herein are not so limited. It should be appreciated that such analyses can also be used to solve for unmeasured parameters. Through the analyses, system level responses are evaluated to establish a data matching principle, which provides for creating estimates of parameters that are not directly measured. At block 334, an engine shop visit (e.g., off-wing) performance analysis is performed for cruise and/or take-off periods (e.g., using deltas during cruise and/or take-off periods). See the description of FIG. 8 for additional details. It should be appreciated that the analysis at block 332 can be performed for any relevant phase of flight. The analyses at blocks 332 and 334 can be performed serially, concurrently, simultaneously, and/or in any other suitable order.

Once the analyses are performed at blocks 332 and 334, a potential recovery is calculated at block 336. It should be appreciated that such analyses can be performed for cruise and takeoff periods in some examples, but can extend to any flight phase(s) in other examples. In one or more embodiments, the potential recovery can be at an engine and/or module level and can be extended to component (stage) level recovery analysis. An on-wing projection analysis is then performed at block 338. A workscope analysis is performed at block 340, where a recommendation is generated. At block 342, the recommendation is transmitted to recipients.

According to one or more embodiments described herein, it is a possible usage of the method 300 to inform engine/component/module re-design needs and requirements. According to one or more embodiments described herein, the data collected and analyzed as described herein can be used to influence the design process of an engine/component/module so that the work in the future becomes more efficient in terms of cost and time. For example, if it is observed that a module is frequently repaired before it is completely deteriorated and has remaining useful life, the module (and/or a component thereof) may be redesigned to change that module and manufacture it to a different specification knowing that it does not have to live as long before it comes in for service. This can lead to a less expensive engine and lower part costs. According to one or more embodiments described herein, it is another possible usage of the method 300 to plan for repair and overhaul of engines/components/modules when received in the shop. According to one or more embodiments described herein, it is another possible usage of the method 300 to influence the decision to extend or truncate the planned shop visit timing.

While the above description has described the flow process of FIG. 3 in a particular order, it should be appreciated that unless otherwise specifically required in the attached claims that the ordering of the steps may be varied. Further details of one or more of the blocks of the method 300 are shown and described in more detail with reference to FIGS. 4-10, which are now described.

Figure 4:
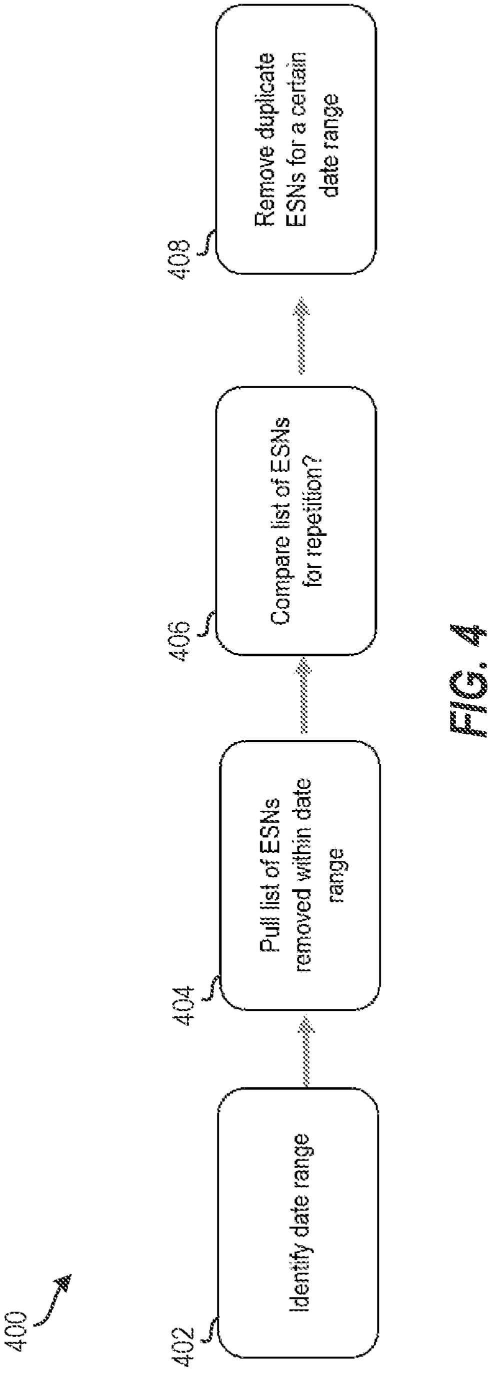
FIG. 4 is a flow chart illustrating a method according to one or more embodiments described herein.

In particular, FIG. 4 depicts a flow diagram of a method 400 for performing an automated scan for engine removal. The method 400 may be performed, for example, by the processing system 200 of FIG. 2 individually and/or in conjunction with an engine controller (not shown) associated with the gas turbine engine 20. The method 400 is an example of the automated scan performed at block 302 of FIG. 3.

At block 402, a date range is identified. At block 404, a list of engine serial numbers (ESNs) removed within the date range are pulled, such as from a database or other data store. At block 406, the list is compared/analyzed for repetitions such that repetitive entries are identified. At block 408, the identified repetitive entries are removed for the date range from block 402. It should be appreciated that, when not assessing recently removed engines, for workscope planning purposes, the analysis described herein can be applied real-time to any on-wing engine in the field.

While the above description has described the flow process of FIG. 4 in a particular order, it should be appreciated that unless otherwise specifically required in the attached claims that the ordering of the steps may be varied.

Figure 5:
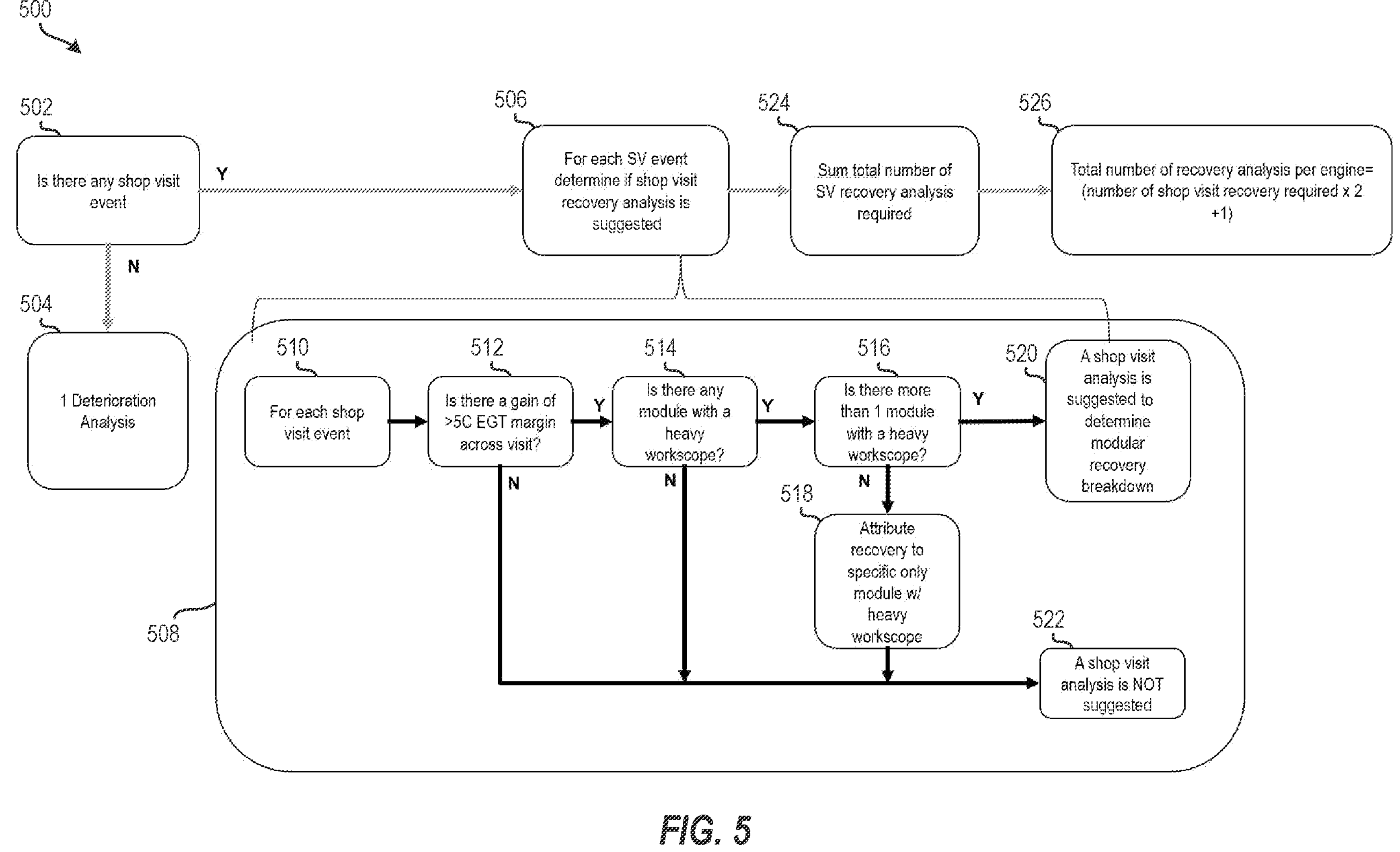
FIG. 5 is a flow chart illustrating a method according to one or more embodiments described herein.

FIG. 5 depicts a flow diagram of a method 500 for analyzing history according to one or more embodiments described herein. Particularly, the method 500 provides for determining a number of performance and shop visit analyses to perform according to one or more embodiments described herein. The method 500 may be performed, for example, by the processing system 200 of FIG. 2 individually and/or in conjunction with an engine controller (not shown) associated with the gas turbine engine 20. The method 500 is an example of determining a number of performance analyses and shop visit analyses from block 326 of FIG. 3.

At block 502, it is determined whether there is a shop visit event (e.g., an event that would necessitate or recommend a shop visit). If not, one deterioration analysis is performed at block 504. A deterioration analysis solves for deterioration per module. If there is only a deterioration analysis needed, it can be expected that each module would recover up to the maximum amount it deteriorated (if work is done on the next visit) but not more. The deterioration per module is found as described herein. Particularly, deltas from both the cruise and takeoff periods are used, though the analysis can be extended to any flight phase. The deltas during cruise are put into a solver with influence coefficients, constraints, bounds, coupling factors, and limits and translated into resulting deterioration per module. The takeoff margin delta, from each of the deterioration periods of interest, is then used to convert the gas path deterioration seen across the deterioration period of interest into the exhaust gas temperature deterioration per engine module. In the case of this step, there is only one deterioration period of interest, there have been no past shop visits on the engine, and therefore recovered deterioration consider from past visits that does not exist when making the workscope recommendation for the upcoming visit, and therefore does not need to be considered. The deterioration period can include multiple installations. An installation changes either when an engine moves positions on the same aircraft, or to another aircraft. It should be appreciated that one or more embodiments not only auto solves for modular deterioration or recovery per module, but also for how the operating line has shifted in each module of the engine. The analysis can also be used to solve for unmeasured parameters. As an example, the analysis evaluates system level responses to establish a data matching principle.

If it is determined whether there is a shop visit event at block 502, the method 500 proceeds to block 506, where it is determined, for each shop visit event, whether a recovery analysis should be performed. The details of the determination at block 506 are shown in more detail in block 508.

At block 510, each shop visit event is analyzed individually. For each shop visit event, it is determined at block 512 whether there is a performance gain that exceeds a threshold (e.g., greater than 5 degrees exhaust gas temperature) due to the visit. It should be appreciated that exhaust gas temperature is one of many system level performance parameters that can be used, such as inter-turbine temperature, among others. If not, it is determined that a shop visit analysis is not suggested at block 522. If, however, there is a threshold gain of EGT at block 512, it is then determined at block 514 whether there is any module with a heavy workscope. A heavy workscope could be any work that takes more than a threshold amount of labor time, threshold cost, etc. If no heavy workscope at block 514, it is determined that a shop visit analysis is not suggested at block 522. If, however, there is a heavy workscope at block 514, it is then determined whether multiple modules have a heavy workscope at block 516. If not, the recovery is attributed to only the specific module with the heavy workscope at block 518, and it is determined that a shop visit analysis is not suggested at block 522. If, however, there is a heavy workscope for multiple modules at block 516, a shop visit analysis is suggested at block 520 to determine a modular recovery breakdown. The method 500 then proceeds to block 524.

At block 524, a total number of shop visit recovery analyses suggested is determined based on how many modules suggest a shop visit analysis be performed. At block 526, a total number of recovery analyses per engine is determined, which can be a number of shop visit recovery suggested times a number of engines (e.g., 2) plus one. The number of analyses (to determine deterioration and recovery per module) are calculated by identifying the number of recovery analysis required (shop visit analysis) and the number of deterioration analyses required (one before every shop visit, and one after the last shop visit). For example, an analysis is performed to see how much an engine deteriorated, then see how much it recovered, then see how much it deteriorated after the visit. The deterioration in each module is then summed and the recovery is subtracted to get the recovery potential per module going into the next shop visit. This means each shop visit analysis needs a deterioration analysis before it (number of shop visit analyses times two) plus one deterioration analysis after it.

While the above description has described the flow process of FIG. 5 in a particular order, it should be appreciated that unless otherwise specifically required in the attached claims that the ordering of the steps may be varied.

Figure 6:
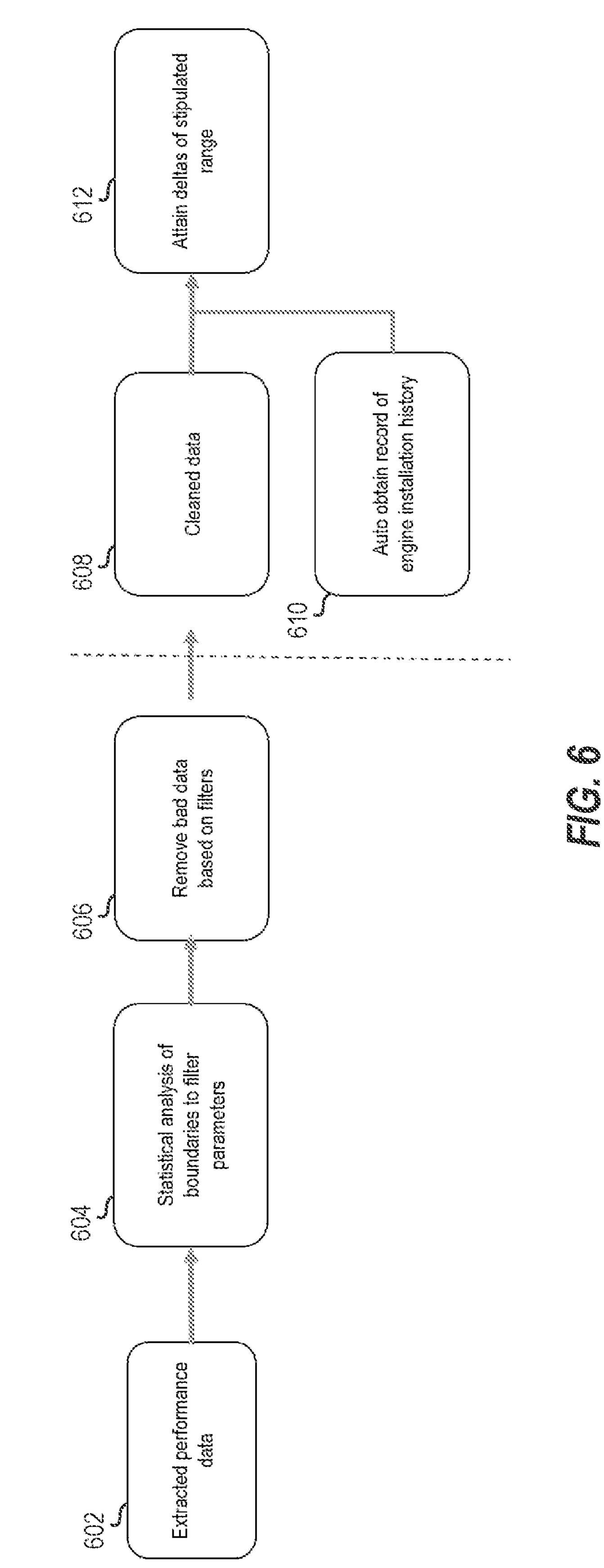
FIG. 6 is a flow chart illustrating a method according to one or more embodiments described herein.

FIG. 6 depicts a flow diagram of a method 600 for performance data cleaning and obtaining post processing performance according to one or more embodiments described herein. The method 600 may be performed, for example, by the processing system 200 of FIG. 2 individually and/or in conjunction with an engine controller (not shown) associated with the gas turbine engine 20.

Performance cleaning (see, e.g., block 328 of FIG. 3) begins at block 602 where performance data are extracted, such as from a data store and/or from the engine directly. At block 604, a statistical analysis is performed to determine boundaries used to filter the performance data. For example, certain parameters are observed that are known affect the gas path deltas used for the deterioration and recovery analysis. An example of a statistical analysis is taking the mean of these impact parameters and filtering out anything outside two standard deviations, for example. In examples, this filters the entire dataset (all parameters), not just the "impact parameters." However, the two standard deviation setting can be changed to any number of standard deviations in other examples. Anything outside the standard deviation selected of the mean is filtered out. The mean and standard deviations for each engine change depending on the real data for that engine. At block 606, the data falling outside the boundaries from block 604 are removed, resulting in cleaned (e.g., filtered) data.

Obtaining post processing performance (e.g., block 330 of FIG. 3) begins at block 608, where the cleaned data (from the performance cleaning) are received. At block 610, records of engine installation history (e.g., when the engine was installed, when it was last maintained, what maintenance was performed, etc.) are obtained. At block 612, deltas are determined using the data from block 608 and the records from block 610. As described herein, the "deltas" are differences in the data (e.g., from block 304) across periods of time (e.g., on wing, in shop, etc.). For example, the cleaned data (block 608) can be compared to the records (block 610), and the differences are determined, which are referred to as the "deltas."

While the above description has described the flow process of FIG. 6 in a particular order, it should be appreciated that unless otherwise specifically required in the attached claims that the ordering of the steps may be varied.

Figure 7:
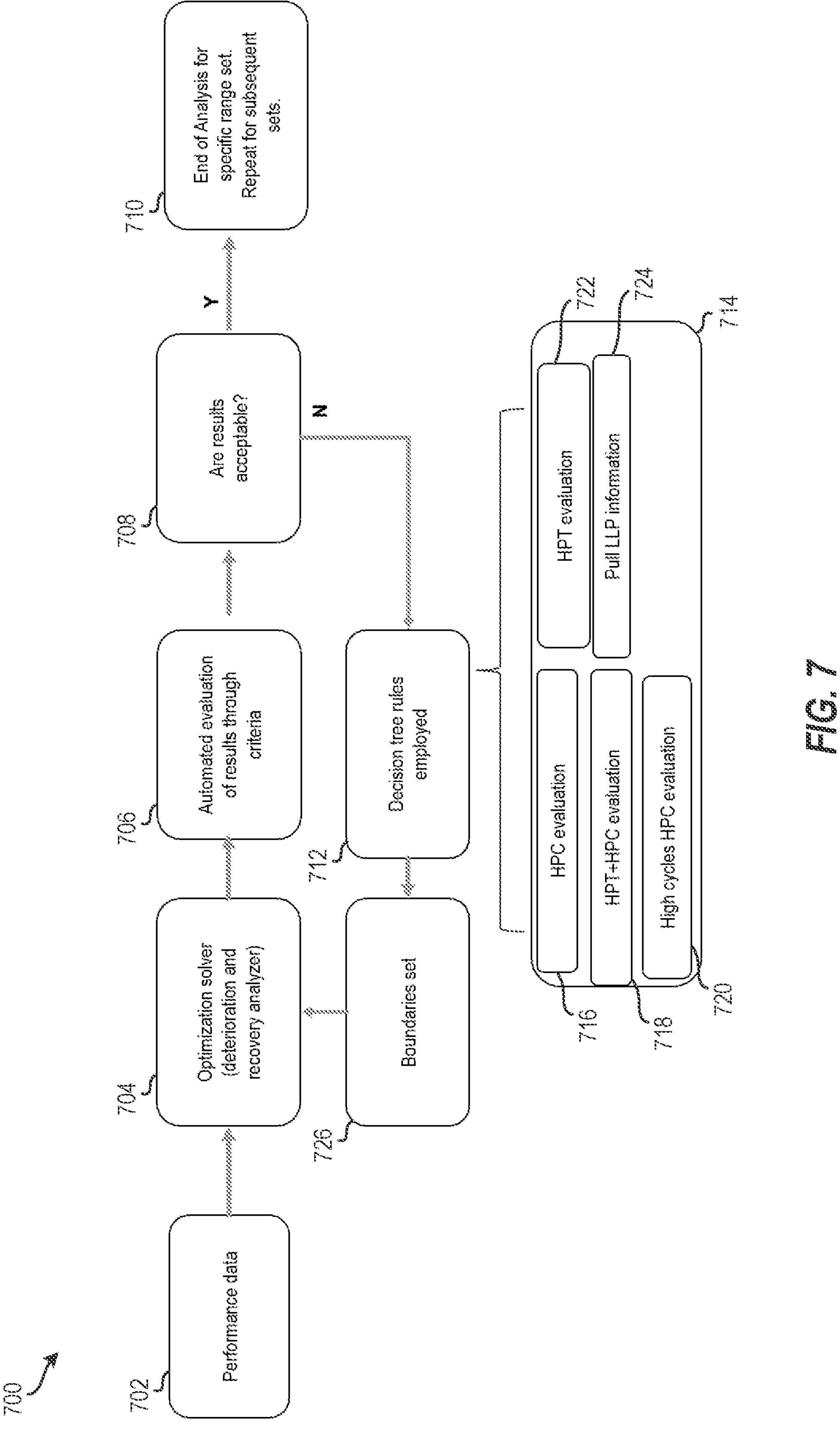
FIG. 7 is a flow chart illustrating a method according to one or more embodiments described herein.

FIG. 7 depicts a flow diagram of a method 700 for on wing engine performance analysis according to one or more embodiments described herein. The method 700 may be performed, for example, by the processing system 200 of FIG. 2 individually and/or in conjunction with an engine controller (not shown) associated with the gas turbine engine 20. The method 700 is an example of performing an on-wing performance analysis from block 332 of FIG. 3.

At block 702, the performance data (e.g., deltas) are received. At block 704, an optimization solver performs a deterioration and recovery analysis. At block 706, an automated evaluation of results through criteria is performed. At block 708, it is determined whether the results from block 706 are acceptable. The optimization solver ties everything together in terms of the delta calculations, the analysis, modular recovery, residuals from each analysis so it can be understood how well the solver worked, operating line impact per module, the bounds of deterioration (e.g., how the gas path flow capacities and efficiencies actually changed). For each analysis, rules are established based on things a human would do when evaluating either a deterioration or recovery analysis. For example, if a deterioration analysis is performed and it is observed that the HPC had no deterioration but the engine has more than a specified number (e.g., 1000) cycles of operation, it can be determined that is implausible and so another analysis is performed, this time forcing deterioration into the HPC (this is the HPC evaluation). In such cases, certain automated rules are employed based on how an engine is expected to behave in terms of deterioration. To evaluate the rules, pieces of each analysis result are automatically extracted and evaluated against certain criteria on expected engine behavior. If the behavior is not acceptable, another analysis or set of analyses is performed, and the result is checked again. This can be repeated until the analysis is acceptable. For example, each deterioration analysis can have up to five deterioration analysis (one initial, and then a series of evaluation) before moving onto the recovery analysis period (shop visit analysis). These rules are however not limiting in any way, as additional rules can be incorporated as more knowledge is gained about the engine operation. In one or more embodiments, a set order in which the decision tree rules and number of re-analysis regarding the evaluation of results after each rule is incorporated can be implemented but is not limiting, as rules can potentially change dependent on engine configuration.

At block 706, an automated evaluation of results through criteria is performed. At block 708, it is determined whether the results from block 706 are acceptable. If so, the analysis ends for a specific range set but can be repeated from subsequent sets.

If, however, at block 708, it is determined that the results from block 706 are not acceptable, the method 700 continues to block 712 where decision tree rules are employed. The decision tree rules are further illustrated in block 714. Particularly, these are rules of whether to exclude different exceptions (e.g., certain events that can be excluded). Block 714 can include a high pressure compressor (HPC) evaluation (block 716), a high pressure temperature (HPT)+HPC evaluation (block 718), a high cycles HPC evaluation (block 720), an HPT evaluation (block 722), and/or pulling of life limiting part (LLP) information (block 724). Any one or more of the blocks within block 714 can be used. Once the decision tree rules are employed at block 712, the method 700 proceeds to set boundaries at block 726 (e.g., operating boundaries). For example, a boundary could be a threshold HPC pressure that should not be exceeded. The boundaries from block 726 are fed into the optimization solver (block 704), and the method 700 continues.

While the above description has described the flow process of FIG. 7 in a particular order, it should be appreciated that unless otherwise specifically required in the attached claims that the ordering of the steps may be varied and similar additional rules can be employed.

Figure 8:
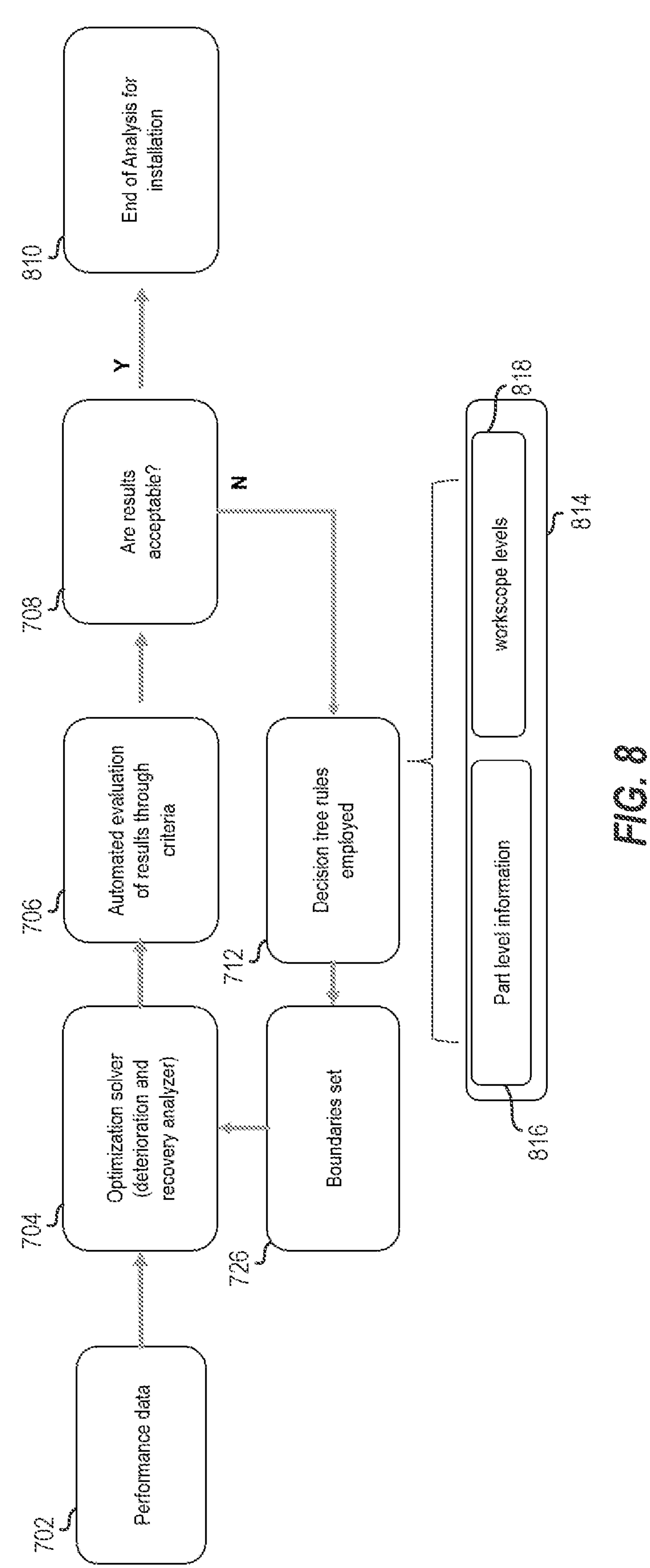
FIG. 8 is a flow chart illustrating a method according to one or more embodiments described herein.

FIG. 8 depicts a flow diagram of a method 800 for shop visit engine performance analysis according to one or more embodiments described herein. The method 800 may be performed, for example, by the processing system 200 of FIG. 2 individually and/or in conjunction with an engine controller (not shown) associated with the gas turbine engine 20. The method 800 is an example of performing a shop visit performance analysis from block 334 of FIG. 3.

The method 800 is similar, in some respects, to the method 700. For example, as described herein, the method 800 includes receiving the performance data (e.g., deltas) (block 702), performing a deterioration and recovery analysis (block 704), performing an automated evaluation of results through criteria (block 706), determining whether the results from block 706 are acceptable, employing decision tree rules (block 712), and setting boundaries (block 726), which are fed back into the optimization solver (block 704). However, in this example, if it is determined that the results are acceptable at block 708, the method 800 proceeds to block 810, where the analysis for the installation ends. If the results are not acceptable at block 708, the decision tree rules employed at block 712 differ, as shown at block 814. For example, the decision tree rules are further illustrated in block 814. Block 814 can include part-level information 816 and workscope levels 818.

The method 800 provides for improving engine performance by improving an amount of margin on a per-module basis such that shop visit time can be reduced, thus increasing the amount of on-wing time.

While the above description has described the flow process of FIG. 8 in a particular order, it should be appreciated that unless otherwise specifically required in the attached claims that the ordering of the steps may be varied.

Figure 9:
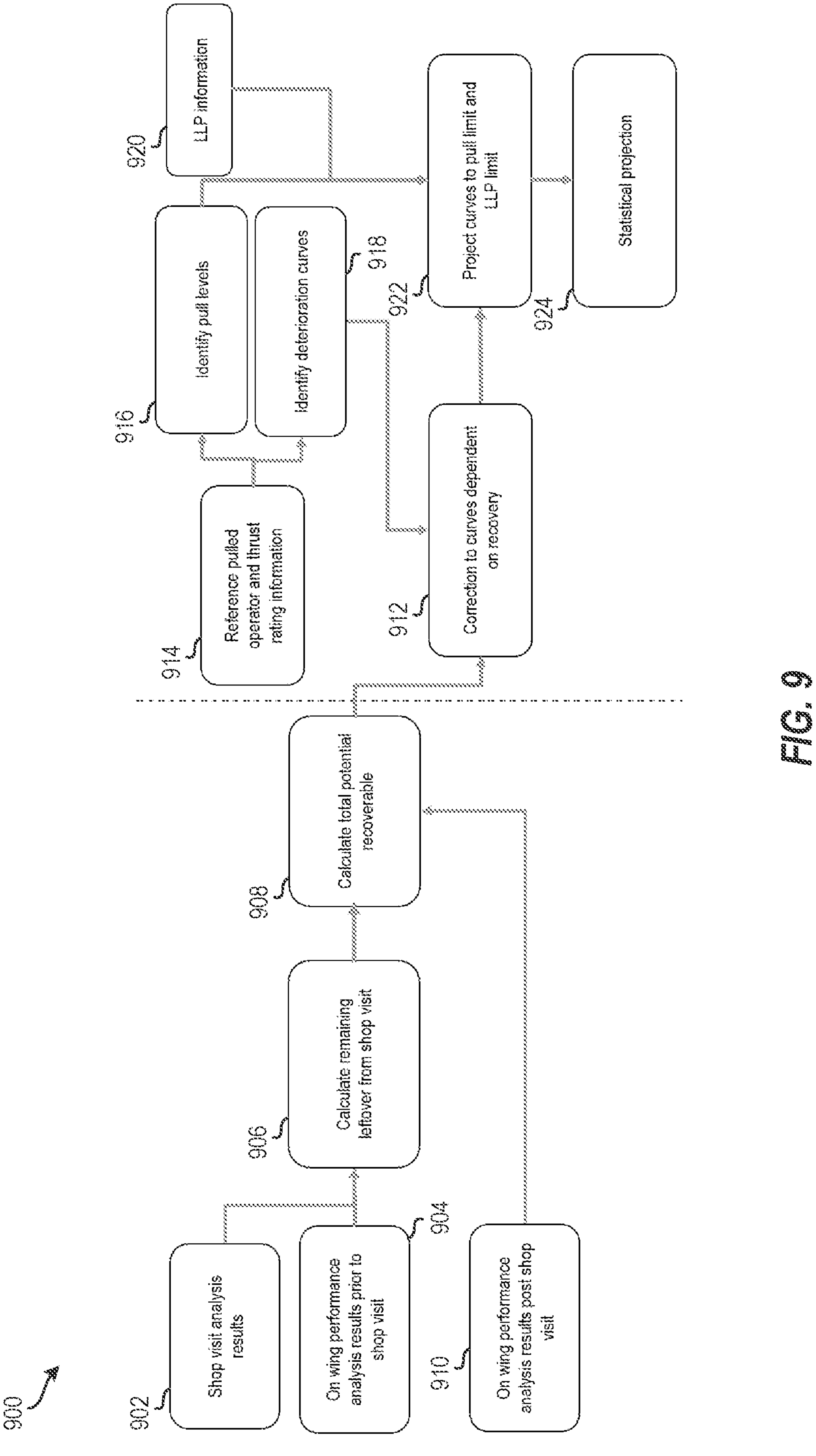
FIG. 9 is a flow chart illustrating a method according to one or more embodiments described herein.

FIG. 9 depicts a flow diagram of a method 900 for calculating potential recovery and performing an analysis time on wing according to one or more embodiments described herein. The method 900 may be performed, for example, by the processing system 200 of FIG. 2 individually and/or in conjunction with an engine controller (not shown) associated with the gas turbine engine 20.

First, a potential recovery can be calculated (see calculating a potential recovery from block 336 of FIG. 3) using blocks 902-910. At block 902, shop visit analysis results are obtained (e.g., using the method 700). At block 904, on wing performance analysis results are obtained, such as for time periods before the shop visit (e.g., using the method 800). At block 906, a remaining leftover recoverable amount from the shop visit is calculated, and at block 908, a total potential recoverable amount of time is obtained using the results from block 906 as well as the on wing performance analysis post shop visit from block 910.

Once the potential recovery is calculated, a time on wing projection analysis can be performed (see time on wing projection analysis from block 338 of FIG. 3). At block 912, the total potential recoverable amount is received from block 908, and a correction to curves dependent on recovery is determined. This determination at block 912 is based at least in part on identified deterioration curves at block 918 using pulled operator and thrust rating information at block 914. Pull levels are also identified at block 916. At block 922, the curves are projected to the pull limit and an LLP limit from block 920, and a statistical projection can then be performed at block 924. As an example, the pull limit and LLP limit are projected to a target interval, which can be determined using a target build standard. Regarding the statistical projection, the time on wing projections can be performed in terms of 50% confidence (which is a nominal projection), and a 90% lower sided confidence projection, for example, although other confidence projection values can be used. This is a worst case scenario for time on wing remaining to each of the limits. The 90% confidence delta takes into account the variation in exhaust gas temperature margin for an engine, and variation in the exhaust gas temperature margin for a particular fleet. A sigma is calculated using both of these, and the nominal curve is shifted down the amount of the resulting delta. This therefore would make an engine that hits the pull margin in say the next 3500 cycles nominally, maybe hit the pull margin in 3000 cycles using the 90% lower sided confidence (more conservative) estimate. Both results can be provided, and it may be expected that the engine will fall somewhere in the middle of these estimates.

While the above description has described the flow process of FIG. 9 in a particular order, it should be appreciated that unless otherwise specifically required in the attached claims that the ordering of the steps may be varied.

Figure 10:
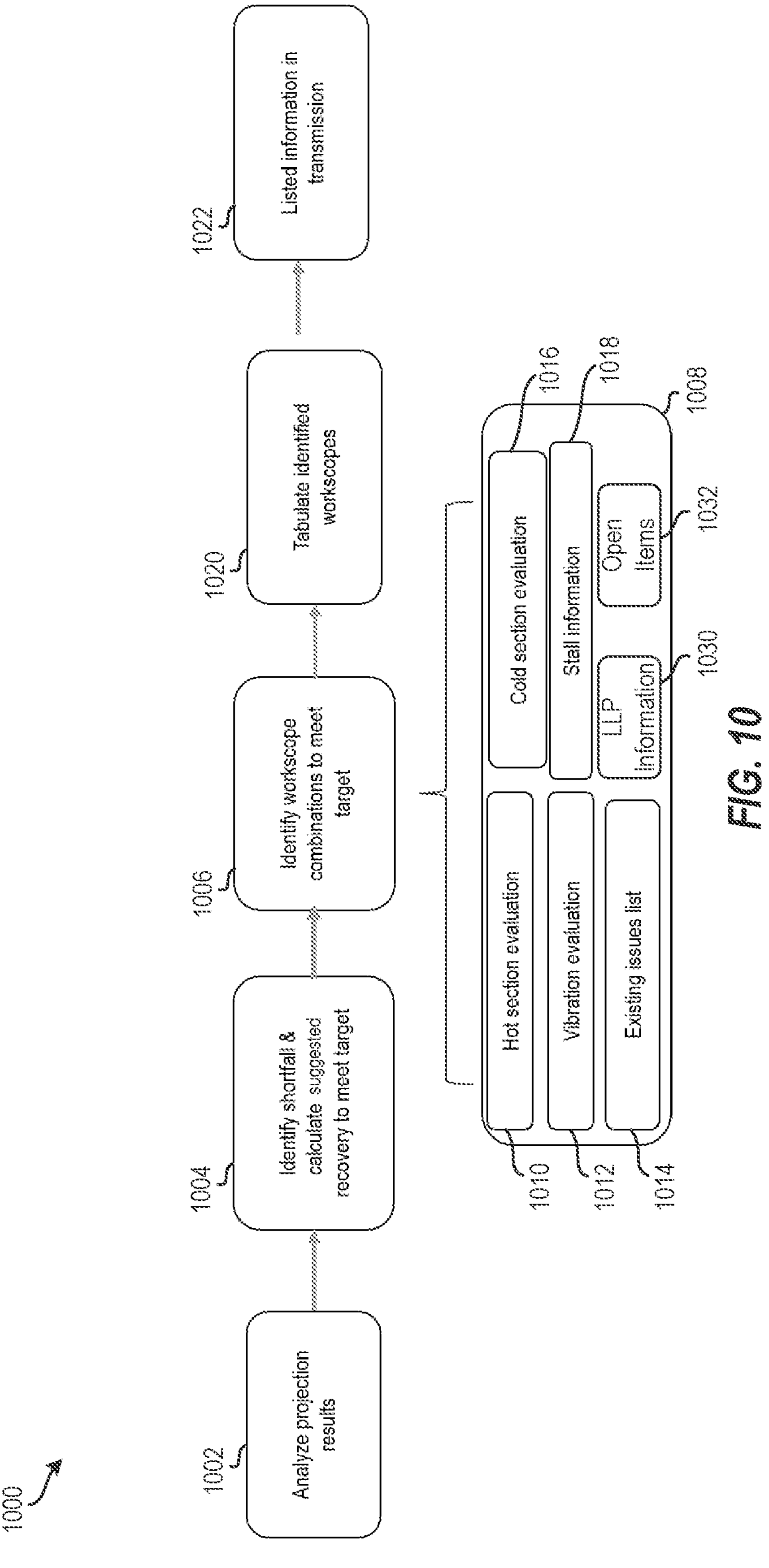
FIG. 10 is a flow chart illustrating a method according to one or more embodiments described herein.

FIG. 10 depicts a flow diagram of a method 1000 for performing workscope analysis and generating a recommendation according to one or more embodiments described herein. The method 1000 may be performed, for example, by the processing system 200 of FIG. 2 individually and/or in conjunction with an engine controller (not shown) associated with the gas turbine engine 20. The method 1000 is an example of performing workscope analysis and generating a recommendation from block 340 of FIG. 3.

At block 1002, projection results are analyzed, and at block 1004, any shortfall is identified so that a suggested recovery can be calculated to meet a target/threshold. At block 1006, workscope combinations are identified to meet the target/threshold. As further shown in block 1008, identifying the workscope combinations can include one or more of performing a hot section evaluation (block 1010), performing a vibration evaluation (block 1012), referencing an existing issues list (block 1014), performing a cold section evaluation (block 1016), referencing stall information (block 1018), referencing LLP information (block 1030) and/or referencing open items (block 1032). The existing issues may have arisen on wing that need to be addressed in the shop, from an aspect of the engine belonging to a specific population and therefore ends up with something that needs to be addressed in the upcoming visit. In one or more embodiments, LLP information throughout the engine can also be referenced as well as any open items that need to be addressed at the next shop visit or any noted on wing concerns. Once the workscope combinations are identified, the method 1000 proceeds to block 1020 where identified workscopes are tabulated. The tabulated workscopes are then used to generate a recommendation as listed information for transmission at block 1022.

While the above description has described the flow process of FIG. 10 in a particular order, it should be appreciated that unless otherwise specifically required in the attached claims that the ordering of the steps may be varied.

An advantage of one or more embodiments described herein provides for life of plan optimization of maintenance using engine condition and other available data sources. Accordingly, it can better be determined when maintenance on a certain module(s) and part(s) should be performed given the requirements of the hardware and customer requirements. Another advantage of one or more embodiments described herein, the time to generate workscopes has been reduced significantly, (e.g., by 2-10 hours). Another advantage of one or more embodiments described herein, by planning the right workscope, the first pass yield at overhaul shops is improved because the common drivers for test issues are addressed. Another possible usage includes informing re-design needs and requirements.

Another advantage of one or more embodiments described herein is that more informed fleet management is provided in terms of engine removal planning and overall shop visit planning to level load engine shops in a more informed way. For example, one or more of the analyses described herein affects the plans for repair and overhaul of parts when received in the shop. The one or more analyses may also influence the decision to extend or truncate the planned shop visit timing. The consolidated data sources/analytics for removal projections can also be displayed to the customer so they can better determine their needs as the fleet matures according to one or more embodiments described herein. An advantage of one or more embodiments described herein is that the performance analysis can be utilized for lease returns to automatically determine if an engine is serviceable and avoid needing a power assurance test on-wing by the airline. This saves fuel and time of a lessee (e.g., an airline) in returning their leased engine assets.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:

performing an automated scan of a database for engine removal, by a processing system comprising at least a processing device communicatively coupled to a system memory;

performing a deterioration and recovery analysis on a per-engine basis, based on the automated scan of the database, by the processing system, by:

obtaining engine data associated with an engine installed on a wing of an aircraft, by the processing system via an engine controller for the engine;

analyzing the engine data to determine a number of engine on-wing performance analyses to perform and a number of engine shop visit performance analyses to perform, the on-wing performance indicating an operational performance of the engine while installed on the wing of the aircraft, the on-wing performance indicating an operational performance of the engine while installed on the wing of the aircraft, and the engine shop visit performance analyses a indicating an operational performance of the engine obtained during testing of the engine while removed from the wing of the aircraft;

performing post processing on the engine data subsequent to analyzing the engine data;

performing an engine on-wing performance analysis;

performing an engine shop visit performance analysis;

performing a workscope analysis to generate a recommendation, the workscope analysis indicating at least one of a maintenance task, inspection, and repair to be performed on an aircraft engine; and transmitting the recommendation for servicing the engine to one or more recipients, by the processing system, wherein performing the post processing comprises determining a plurality of delta values, wherein the plurality of delta values represent differences in the engine data from a first time to a second time, and wherein an optimization solver of the processing device is input with the plurality of delta values along with translation inputs including coupling factors that account for interdependencies between components, constraints that maintain physical and operational relationships between variables, bounds that define acceptable parameter ranges, and limits that establish thresholds, and, and wherein the optimization solver applies the translation inputs to the plurality of delta values and outputs a resulting deterioration value that quantifies the operational degradation of the engine over time, wherein the plurality of delta values are input into an optimization solver of the processing device.

2. The method of claim 1, wherein the engine data comprises at least one of a thrust rating history, shop visit information indicating a time during which maintenance is performed on the engine while it is removed from the wing of the aircraft, vibration information, performance parameters, known issues of the engine arisen on-wing, engine installation history, life limited part information, event information indicating failure of a component of the engine, and a watch item corresponding to a part of the engine targeted for periodic monitoring.

3. The method of claim 1, wherein the engine on-wing performance analysis is performed for a cruise phase of flight.

4. The method of claim 1, wherein the engine shop visit performance analysis is performed for a cruise phase of flight and a takeoff phase of flight.

5. The method of claim 1, further comprising cleaning the engine data subsequent to analyzing the engine data wherein cleaning the engine data removes outliers and noise from the engine data.

6. The method of claim 1, further comprising performing post processing on the engine data subsequent to analyzing the engine data.

7. The method of claim 6, wherein performing the post processing comprises determining a plurality of delta values, wherein the plurality of delta values represent differences in the engine data from a first time to a second time.

8. The method of claim 1, further comprising calculating a potential recovery indicating an amount of time required to complete service of the engine.

9. The method of claim 1, further comprising performing a time on-wing projection analysis indicating an amount of time the engine is installed on the wing of the aircraft compared to an amount of time the engine undergoes an engine shop visit for maintenance.

10. A system comprising:

a memory comprising computer readable instructions; and a processing device for executing the computer readable instructions, the computer readable instructions controlling the processing device to perform operations comprising:

performing an automated scan of a database for engine removal, by a processing system comprising at least a processing device communicatively coupled to a system memory;

performing a deterioration and recovery analysis on a per-engine basis, based on the automated scan of the database, by the processing system, by:

obtaining engine data associated with an engine, by the processing system via an engine controller for the engine;

analyzing the engine data to determine a number of engine on-wing performance analyses to perform and a number of engine shop visit performance analyses to perform, the on-wing performance indicating an operational performance of the engine while installed on the wing of the aircraft, and the engine shop visit performance analyses indicating an operational performance of the engine obtained during testing of the engine while removed from the wing of the aircraft;

performing post processing on the engine data subsequent to analyzing the engine data;

performing an engine on-wing performance analysis;

performing an engine shop visit performance analysis;

performing a workscope analysis to generate a recommendation, the workscope analysis indicating at least one of a maintenance task, inspection, and repair to be performed on an aircraft engine; and transmitting the recommendation to be implemented to service the engine for servicing the engine to one or more recipients, by the processing system, wherein performing the post processing comprises determining a plurality of delta values, wherein the plurality of delta values represent differences in the engine data from a first time to a second time, and wherein an optimization solver of the processing device is input with the plurality of delta values along with translation inputs including coupling factors that account for interdependencies between components, constraints that maintain physical and operational relationships between variables, bounds that define acceptable parameter ranges, and limits that establish thresholds, and wherein the optimization solver applies the translation inputs to the plurality of delta values and outputs a resulting deterioration value that quantifies the operational degradation of the engine over time.

11. The system of claim 10, wherein the engine data comprises at least one of a thrust rating history, shop visit information indicating a time during which maintenance is performed on the engine while it is removed from the wing of the aircraft, vibration information, performance parameters, known issues of the engine arisen on-wing, engine installation history, life limited part information indicating a remaining useful life of the engine, event information indicating failure of a component of the engine, and a watch item corresponding to a part of the engine targeted for periodic monitoring.

12. The system of claim 10, wherein the engine on-wing performance analysis is performed for a cruise phase of flight.

13. The system of claim 10, wherein the engine shop visit performance analysis is performed for a cruise phase of flight and a takeoff phase of flight.

14. The system of claim 10, the operations further comprising cleaning the engine data subsequent to analyzing the engine data, wherein cleaning the engine data removes outliers and noise from the engine data.

15. The system of claim 10, the operations further comprising performing post processing on the engine data subsequent to analyzing the engine data.

16. The system of claim 15, wherein performing the post processing comprises determining a plurality of delta values, wherein the plurality of delta values represent differences in the engine data from a first time to a second time.

17. The system of claim 10, the operations further comprising calculating a potential recovery indicating an amount of time required to complete service of the engine.

18. The system of claim 10, the operations further comprising performing a time on-wing projection analysis indicating an amount of time the engine is installed on the wing of the aircraft compared to an amount of time the engine undergoes an engine shop visit for maintenance.

19. A computer program product comprising a non-transitory computer readable storage medium having program instructions embodied therewith, the program instructions executable by a processor to cause the processor to perform operations comprising:

performing an automated scan of a database for engine removal, by a processing system comprising at least a processing device communicatively coupled to a system memory;

performing a deterioration and recovery analysis on a per-engine basis, based on the automated scan of the database, by the processing system, by:

obtaining engine data associated with an engine, by the processing system via an engine controller for the engine;

analyzing the engine data to determine a number of engine on-wing performance analyses to perform and a number of engine shop visit performance analyses to perform, the on-wing performance indicating an operational performance of the engine while installed on the wing of the aircraft, the on-wing performance indicating an operational performance of the engine while installed on the wing of the aircraft, and the engine shop visit performance analyses a indicating an operational performance of the engine obtained during testing of the engine while removed from the wing of the aircraft; performing post processing on the engine data subsequent to analyzing the engine data;

performing an engine on-wing performance analysis;

performing an engine shop visit performance analysis;

performing a workscope analysis to generate a recommendation, the workscope analysis indicating at least one of a maintenance task, inspection, and repair to be performed on an aircraft engine; and transmitting the recommendation for servicing the engine to one or more recipients, by the processing system, wherein transmitting the recommendation comprises:

performing, by the processing system, a time-on-wing projection analysis that combines the resulting deterioration value with a calculated potential recovery, projects remaining time-on-wing to at least one of a pull-margin limit and a life-limited-part limit, and generates a projected removal date at both nominal and 90% lower-sided confidence levels; and storing the projected removal date together with the recommendation in a fleet-maintenance database to facilitate engine-removal planning and shop-visit load-leveling across the operator's fleet, wherein performing the post processing comprises determining a plurality of delta values, wherein the plurality of delta values represent differences in the engine data from a first time to a second time, and wherein an optimization solver of the processing device is input with the plurality of delta values along with translation inputs including coupling factors that account for interdependencies between components, constraints that maintain physical and operational relationships between variables, bounds that define acceptable parameter ranges, and limits that establish thresholds, and wherein the optimization solver applies the translation inputs to the plurality of delta values and outputs a resulting deterioration value that quantifies the operational degradation of the engine over time.

20. The computer program product of claim 19, the operations further comprising:

cleaning the engine data subsequent to analyzing the engine data, wherein cleaning the engine data removes outliers and noise from the engine data;

performing post processing on the engine data subsequent to analyzing the engine data, wherein performing the post processing comprises determining a plurality of delta values, wherein the plurality of delta values represent differences in the engine data from a first time to a second time;

calculating a potential recovery indicating an amount of time required to complete service of the engine; and performing a time on-wing projection analysis indicating an amount of time the engine is installed on the wing of the aircraft compared to an amount of time the engine undergoes an engine shop visit for maintenance.

* * * * *